United States Patent
Booker et al.

(10) Patent No.: US 6,585,601 B2
(45) Date of Patent: Jul. 1, 2003

(54) LONG PLUNGE VL JOINT

(75) Inventors: Daniel Booker, Troy, MI (US); Theodore H. Collins, Rochester Hills, MI (US); Joachim Proelss, Ober-Ramstadt (DE)

(73) Assignee: GKN Automotive, Inc., Auburn Hills, MI (US)

( * ) Notice: Subject to any disclaimer, the term of this patent is extended or adjusted under 35 U.S.C. 154(b) by 0 days.

(21) Appl. No.: 09/944,926

(22) Filed: Aug. 31, 2001

(65) Prior Publication Data

US 2003/0045365 A1 Mar. 6, 2003

(51) Int. Cl.[7] ............................................. F16D 3/16
(52) U.S. Cl. .................................. 464/146; 464/167
(58) Field of Search .............................. 464/146, 167, 464/906; 384/49; 280/777; 188/371; 180/232

(56) References Cited

U.S. PATENT DOCUMENTS

| | | | | |
|---|---|---|---|---|
| 3,664,152 A | * | 5/1972 | Macielinski | 464/906 |
| 3,788,148 A | * | 1/1974 | Connel et al. | 188/371 X |
| 4,004,435 A | * | 1/1977 | Rubin | 464/146 X |
| 5,795,233 A | * | 8/1998 | Eschbach et al. | 464/906 |
| 5,984,354 A | * | 11/1999 | Kim | 280/777 |
| 6,024,383 A | * | 2/2000 | Fohl | 188/371 X |
| 6,171,196 B1 | * | 1/2001 | Welschof | 464/146 |

FOREIGN PATENT DOCUMENTS

| | | | | |
|---|---|---|---|---|
| JP | | 3-249430 | * 11/1991 | 464/146 |

* cited by examiner

Primary Examiner—Gregory J. Binda
(74) Attorney, Agent, or Firm—Mick A. Nylander

(57) ABSTRACT

A propeller shaft assembly (10) comprising a constant velocity universal joint (12) including a hollow shaft (20) and a connecting shaft (18) is provided. The hollow shaft (20) includes an outer joint part (23) having an outer race surface (31) that includes an outer forward portion (32) and an outer rearward portion (34). The connecting shaft (18) includes an inner joint part (25) having an inner race surface (33) that includes an inner forward portion (35) and an inner rearward portion (36). The connecting shaft (18) further includes a recessed surface portion (38). A ball cage (26) that has a plurality of torque transmitting balls (28) is included. During a collision, the torque transmitting balls (28) translate off said inner race surface (33) and drop into the recessed surface portion (38) allowing the connecting shaft (18) to collapse into the hollow shaft (20).

18 Claims, 3 Drawing Sheets

LONG PLUNGE VL JOINT

TECHNICAL FIELD

The present invention relates generally to motor vehicle propeller shafts, and more particularly to an apparatus capable of minimizing the transfer of crash load and/or absorbing energy within a propeller shaft of a motor vehicle.

BACKGROUND OF THE INVENTION

Propeller shafts are commonly used in motor vehicle propulsion. The multi-piece propeller shaft is used when larger distances exist between a front drive unit and the rear axle of the vehicle. The multi-piece propeller shaft transmits torque from the front drive unit to a rear axle. The multi-piece propeller shafts are typically supported by a center-bearing and corresponding support bracket. The center-bearing and support bracket support the center of the propeller shaft while still allowing the drive shaft to rotate and transfer mechanical energy from the front drive unit to the rear axle.

Besides transferring mechanical energy, it is desirable for propeller shafts to have adequate crashworthiness, be lightweight, and be easy and inexpensive to manufacture. In regards to crashworthiness, it is desirable for the propeller shaft to be capable of collapsing axially to prevent it from buckling, penetrating the passenger compartment, or damaging other vehicle components in close proximity to the propeller shaft. In some design scenarios, it may be desirable for the shaft to absorb a considerable amount of the deformation energy. In other design scenarios, the ability to collapse under very low loading may be a greater priority.

The amount of deformation energy absorbed, or the amount of energy required to initiate the collapse of the propeller shaft, can have an impact on the vehicle design and performance. Modern vehicles are purposely designed with crumple zones that allow the vehicle to absorb energy during collisions to prevent the transfer of such damaging energy to the vehicle occupants while attempting to preserve the integrity of the passenger compartment. The amount of energy required to axially collapse the propeller shaft, and the amount absorbed while collapsing can have an influence on how the crumple zones perform during collision.

Present crash features often utilize independent elements that deform to allow the propeller shaft to collapse under certain loading conditions. These independent elements often add to the complexity and cost of propeller shaft manufacture. They can also present design challenges when relatively low collision/collapse forces are desired while robust strength for normal usage is required. Finally, present collapsible features typically only provide a single resistive force profile in relation to a collision. Once the force necessary to effectuate collapse of the joint has been experienced, often relatively little additional collision energy is absorbed by the collapsing joint. Additional absorbed collision energy can result in beneficial safety and performance characteristics.

There is therefore a need for a collapsible two-piece propeller shaft that is capable of providing designers with the ability to control the collapsing force profile without adding to the complexity and cost of the velocity joint manufacturing. In addition, it would be highly desirable to have a collapsible two-piece propeller shaft capable of absorbing additional collision energy after the initial collapsing force has been realized. If the above improvements can be achieved, the safety of motor vehicles may be increased, the cost of manufacturing can be reduced, and an increase in the control over energy absorbed during collision may be realized.

SUMMARY OF THE INVENTION

Accordingly, an object of the present invention is to provide an improved propeller shaft assembly. An advantage of the present invention is that it provides improved crashworthiness, improved control over collision energy absorption, and is easier to manufacture than existing propeller shaft assemblies.

In accordance with the objects of the present invention, a propeller shaft assembly for a vehicle is provided. The propeller shaft assembly includes a constant velocity universal joint in a propeller shaft of a motor vehicle connecting a drive unit to a rear axle gearbox. The constant velocity universal joint includes at least two articulatably connected shaft portions, a hollow shaft, and a connecting shaft. The hollow shaft is connected to an outer joint part that includes an outer race surface having an outer forward portion and an outer rearward portion. The connecting shaft is connected to an inner joint part that includes an inner race surface having an inner forward portion and an inner rearward portion. The connecting shaft also includes a recessed surface portion. A plurality of torque transmitting balls are held by a ball cage and each are guided in one pair of corresponding outer and inner race surfaces. The ball cage holds the torque transmitting balls in a plane when the torque transmitting balls are in communication with the inner race surface and the outer race surface. When the propeller shaft assembly is involved in a collision, the torque transmitting balls translate off the inner race surface and drop into the recessed surface portion to allow the connecting shaft to collapses into the hollow shaft.

One of several advantages of the present invention is that it may forcibly collapse within itself at low collision loads. Another advantage of the present invention is that it minimizes the number of components used as compared to conventional shaft assemblies, thereby reducing mass and imbalance of the vehicle propeller shaft. Reduced mass and imbalance improves quality, decreases noise and vibration, and reduces costs in production and manufacturing of the propeller shaft.

The present invention itself, together with further objects and attendant advantages, will be best understood by reference to the following detailed description, taken in conjunction with the accompanying drawings.

BRIEF DESCRIPTION OF THE DRAWING

For a more complete understanding of this invention reference should now be had to the embodiments illustrated in greater detail in the accompanying figures and described below by way of examples of the invention wherein.

DETAILED DESCRIPTION OF THE PREFERRED EMBODIMENT

In the following description, various operating parameters and components are described for one constructed embodiment. These specific parameters and components are included as examples and are not meant to be limiting.

While the present invention is described with respect to an apparatus for absorbing energy within a propeller shaft of a vehicle the following apparatus is capable of being adapted for various purposes including: automotive vehicles, motor systems that use a propeller shaft, or other vehicle and non-vehicle applications that require energy absorption within a propeller shaft.

Figure 1:
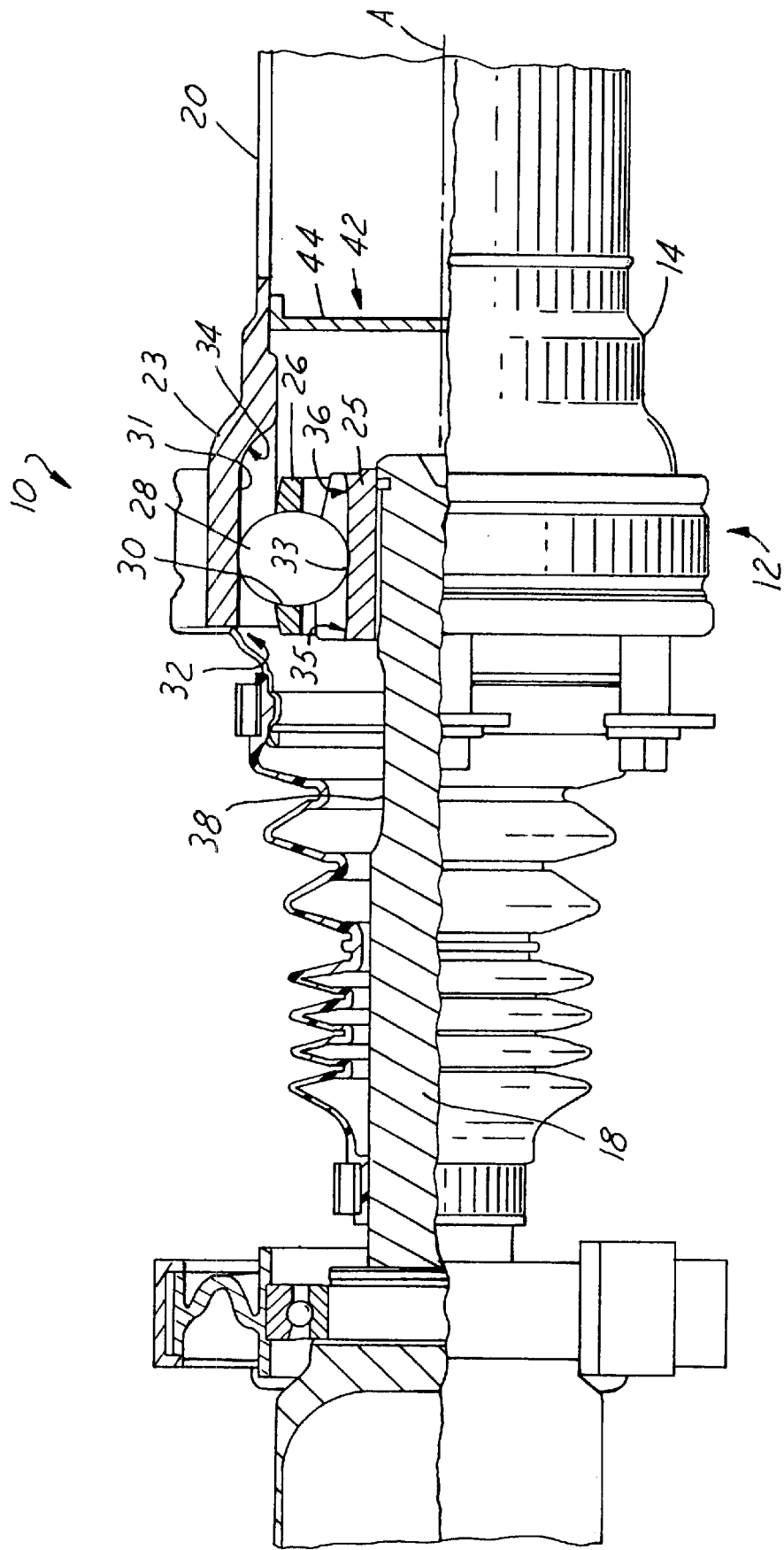
FIG. 1 is a cross-sectional view of a propeller shaft assembly including a constant velocity universal joint in a propeller shaft of a motor vehicle positioned as if during "normal" operation and in accordance with one embodiment of the present invention.

Referring now to FIG. 1, a cross-sectional view of a propeller shaft assembly 10 comprising a constant velocity (CV) universal joint 12 in a propeller shaft 14 of a motor vehicle positioned as if during "normal" operation and in accordance with the present invention is shown. Although the propeller shaft 14 of the present invention is illustrated as having two articulatable shaft portions (a connecting shaft portion 18 and a hollow shaft portion 20) more shaft portions may be incorporated.

The CV joint 12 is an axially plungeable constant velocity universal joint that is plungeable along a center axis 'A'. The CV joint 12 includes an outer joint part 23, an inner joint part 25, a ball cage 26 and torque transmitting balls 28 each held in a cage window 30. The outer joint part 23 includes an outer race surface 31 having an outer forward portion 32 and an outer rearward portion 34. The inner joint part 25 includes an inner race surface 33 having an inner forward portion 35 and an inner rearward portion 36. During normal operation, the torque transmitting balls 28 are in communication with the outer race surface 31 allowing rotation of the connecting shaft portion 18 to drive the hollow shaft portion 20.

Figure 2:
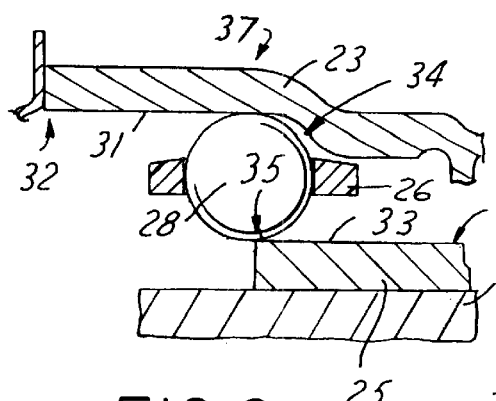
FIG. 2 is a cross-sectional view of a detail of the constant velocity universal joint illustrated in FIG. 1, the constant velocity universal joint shown illustrating a first stop position.

Prior art designs often utilized the outer rearward portion 34 and the inner forward portion 35 to act as a stop, preventing the relative motion of the inner joint part 25 and the outer joint part 23 until a minimum force was applied. This was often accomplished by having the torque transmitting balls 28 remain completely on the inner forward portion 35 when they came in contact with the outer rearward portion 34. Further movement was often only capable of being achieved, in these prior art scenarios, by applying enough force to disintegrate the ball cage 26. This often lead to undesirable forces necessary to effectuate collapse. The present invention eliminates this problem by creating a drop condition 37 (see FIG. 2). The drop condition 37 is created by allowing the torque transmitting balls 28 to cross the edge of the inner forward portion 35 prior to edge of the outer rearward portion 34 contacting the torque transmitting balls 28. This allows for a greater range of collapse forces to be designed into the CV joint 12 including small collapse forces.

Figure 4:
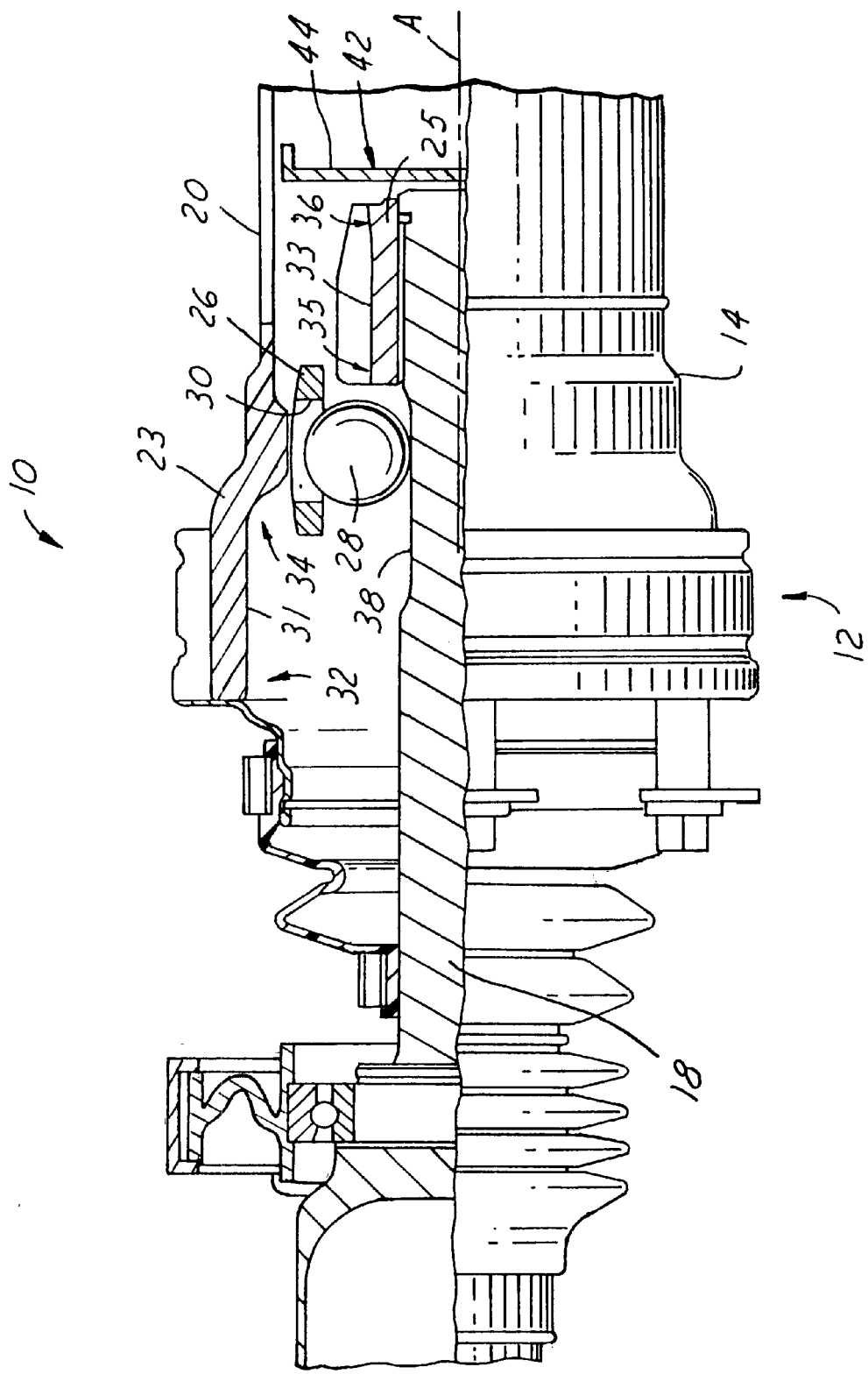
FIG. 4 is a cross-sectional view of a propeller shaft assembly including a constant velocity universal joint in a propeller shaft of a motor vehicle positioned as if during "collapsed" operation and in accordance with one embodiment of the present invention.

When the torque transmitting balls 28 reach the drop condition 37, the present invention can further include a recessed surface portion 38 formed into the connecting shaft 18 (see FIG. 4). This allows the torque transmitting balls 28 to drop down out of their cage windows 30 and position themselves clear of the collapsing shafts. This modification helps prevent binding of the connecting shaft portion 18 and the hollow shaft portion 20 as they collapse. In some prior art designs as discussed, the ball cage 26 was often forced to disintegrate in order to prevent interference with the collapsing shafts. The costs associated with designing a ball cage 26 robust enough to withstand normal operation but capable of disintegrating under collapse could be highly undesirable. In addition, the collapse force required to disintegrate the ball cage 26 was known to interfere with the collapse/force profile desired by many consumers. By separating the torque transmitting balls 28 from the ball cage 26, the present invention reduces the force profile previously needed to prevent the torque transmitting balls 28 from interfering with the collapsing shafts.

Although the present invention can be utilized in the absence of a stop to provide minimal collapse resistance, it is contemplated that the present invention may be used in conjunction with a first stop 42 to create specific crash profiles. The first stop 42 prevents the CV joint 12 from becoming dismantled prior to a collision. In addition, the first stop 42 creates a barrier that necessitates a minimum compressive axial force to be applied to the propeller shaft assembly 10 in order to begin collapsing the shafts. A wide variety of stopping techniques are known in the art and contemplated by this invention. Although the first stop 42 can take on a variety of configurations, in one embodiment it is contemplated it will take the form of a grease cap 44 (see FIG. 1). The grease cap 44 can serve the double purpose of retaining lubrication within the CV joint 12 as well as absorbing energy during collapse. When the connecting shaft portion 18 is collapsed into the hollow shaft portion 20, it impacts the grease cap 44 acting as a first stop 42. Energy from the collision is absorbed as the first stop 42 is pushed off its moorings (see FIG. 4). The first stop 42 may be press-fit into the hollow shaft portion 20 or may be attached in a variety of means to provide a range of minimal collision forces. In addition, the first stop 42 may be formed in a variety of shapes in order to create the force profile necessary to effectuate collapse. Although the first stop 42 has been described as a grease cap 44, it should be understood that a wide variety of first stops 42 are contemplated. In addition, although a single stop has been described, it should be understood that multiple stops may be added in addition to the first stop 42.

Figure 3:
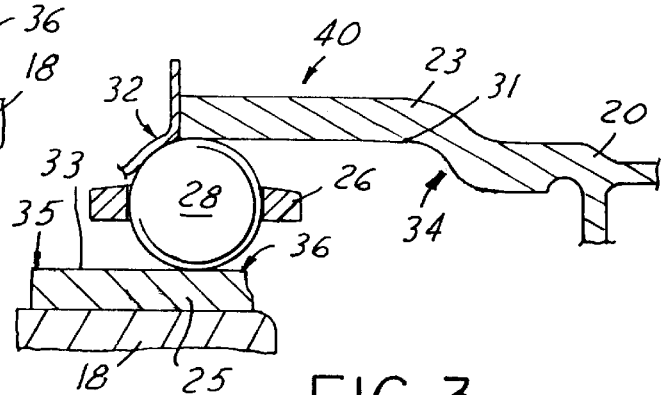
FIG. 3 is a cross-sectional view of a detail of the constant velocity universal joint illustrated in FIG. 1, the constant velocity universal joint shown illustrating an alternate reverse stop position.

The present invention can further be modified to include a forward stop 40 (see FIG. 3). The forward stop 40 can be formed by adapting the outer forward portion 32 and the inner rearward portion 36 such that the torque transmitting balls 28 remain completely on the inner rearward portion 36 when they came in contact with the outer forward portion 32. The forward stop 40 can be utilized to prevent disassembly prior to installation of the propeller shaft assembly 10. In one embodiment, it is contemplated that the forward stop 40 will be formed to prevent disassembly. In alternate embodiments, however, the forward stop 40 can be formed to allow disassembly when a given force is applied to separate the shafts. It should be understood that although a single embodiment of a forward stop 40 has been described, a variety of forward stops 40 would be obvious to those skilled in the art and are contemplated by this invention.

Figure 5:
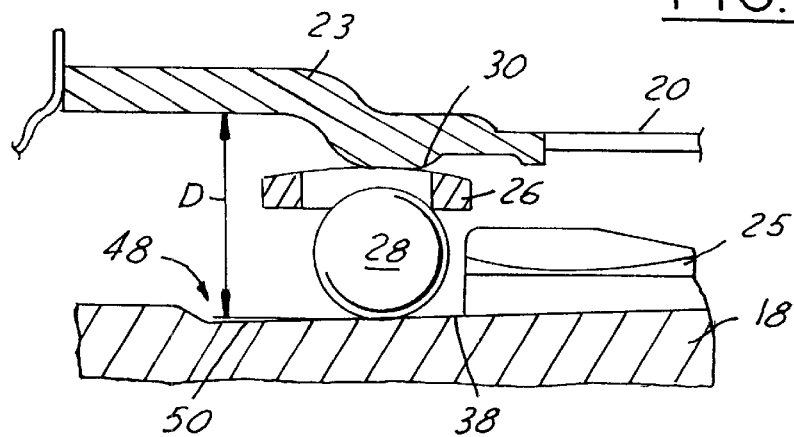
FIG. 5 is a cross-sectional view of a detail of the constant velocity universal joint illustrated in FIG. 4, the constant velocity universal joint shown illustrating decreasing energy absorption embodiment of the recessed surface portion.
Figure 6:
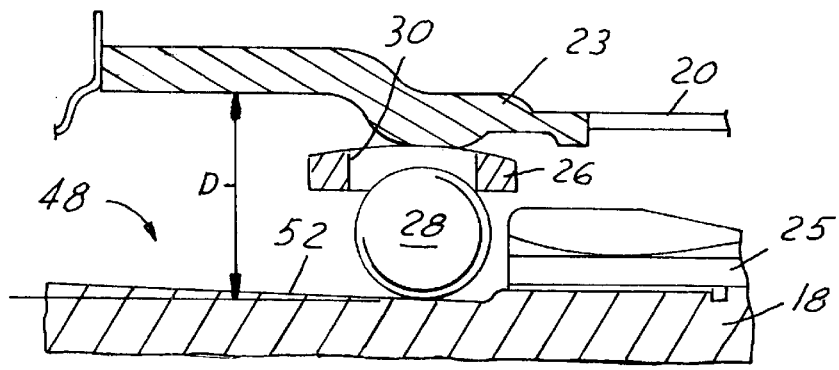
FIG. 6 is a cross-sectional view of a detail of the constant velocity universal joint illustrated in FIG. 4, the constant velocity universal joint shown illustrating an increasing energy absorption embodiment of the recessed surface portion.

In still anther embodiment, the present invention can be modified to provide even further control of the energy absorption during collision. It is contemplated that the recessed surface portion 38 can be modified to provide even greater control over the force/plunge profile. The recessed surface portion 38 may be formed in an energy adsorbing profile 48 such as a decreasing absorption profile 50 (see FIG. 5) where the interference distance D between the hollow shaft portion 20 and the recessed surface portion 38 increases as the shafts 18,20 collapse. In an alternate embodiment illustrated in FIG. 6, the recessed surface portion 38 may be formed in an increasing absorption profile 52 where the interference distance D between the hollow shaft portion 20 and the recessed surface portion 38 decreases as the shafts 18,20 collapse. Although two specific energy absorbing profiles 48 have been described, it should be understood that a wide variety of profiles are contemplated by the present invention. These profiles add further control over the force/collapse rate of the propeller shaft assembly 10.

The number of components in the propeller shaft assembly 10 of the present invention is reduced over prior designs, thereby, reducing overall mass. The reduction in the number of components also reduces the amount of runouts, which occur from tolerances and irregularities in mating components. Runouts cause imbalance in a rotating mass, such as the propeller shaft 10, whose mass center does not lie exactly on an axis of rotation (eccentric). A reduction in components allows the propeller shaft 10 of the present invention to have only one runout from the outer ball track diameter to the rear tube section, thereby, significantly minimizing imbalance of the propeller shaft 10.

The ability of the propeller shaft assembly to collapse within itself at predetermined loads and in a predefined manner improves safety during vehicle impacts and improves crash worthiness of a motor vehicle, in general. The collapsing of the connecting shaft 18 into the hollow shaft 20 contains any debris created by the propeller shaft assembly 10, during a collision, within the hollow shaft 20. Additionally, the collapsing design of the present invention prevents the propeller shaft assembly 10 from deforming and damaging other components of the vehicle in close proximity to the propeller shaft 10. Furthermore, fewer components, improved balance, and reduction in rotating mass reduces production costs and increases operating efficiency of the propeller shaft.

The above-described apparatus, to one skilled in the art, is capable of being adapted for various purposes and is not limited to the following applications: automotive vehicles, motor systems that use a propeller shaft, or other vehicle and non-vehicle applications that require energy absorption within a propeller shaft. The above-described invention may also be varied without deviating from the spirit and scope of the invention as contemplated by the following claims.

What is claimed is:

1. A propeller shaft assembly for a vehicle comprising:
   a constant velocity universal joint comprising:
      an outer joint part including an outer race surface having an outer forward portion and an outer rearward portion;
      an inner joint part including an inner race surface having an inner forward portion and an inner rearward portion, said outer forward portion and said inner rearward portion are adapted to act as a forward stop;
      a plurality of torque transmitting balls each guided in a corresponding pair of said outer and inner race surfaces; and
      a ball cage having a plurality of cage windows each accommodating one of said torque transmitting balls and holding said torque transmitting balls in a plane when said torque transmitting balls are in communication with said inner race surface and said outer race surface;
   a hollow shaft connected to said outer joint part; and
   a connecting shaft connected to said inner joint part and having a recessed surface portion;
   wherein during a collision, said torque transmitting balls translate off said inner race surface and drop into said recessed surface portion allowing said connecting shaft to collapse into said hollow shaft.

2. A propeller shaft assembly as described in claim 1 further comprising:
   a first stop resisting said connecting shaft from collapsing into said hollow shaft.

3. A propeller shaft assembly as described in claim 2 wherein said first stop comprises a grease cap.

4. A propeller shaft assembly as described in claim 1 wherein said recessed surface portion includes an energy absorbing profile.

5. A propeller shaft assembly as described in claim 4 wherein said energy absorbing profile comprises a decreasing absorption profile.

6. A propeller shaft assembly as described in claim 4 wherein said energy absorbing profile comprises an increasing absorption profile.

7. A propeller shaft assembly for a vehicle comprising:
   a constant velocity universal joint comprising:
      an outer joint part including an outer race surface having an outer forward portion and an outer rearward portion;
      an inner joint part including an inner race surface having an inner forward portion and an inner rearward portion;
      a plurality of torque transmitting balls each guided in a corresponding pair of said outer and inner race surfaces; and
      a ball cage having a plurality of cage windows each accommodating one of said torque transmitting balls and holding said torque transmitting balls in a plane when said torque transmitting balls are in communication with said inner race surface and said outer race surface;
   a hollow shaft connected to said outer joint part;
   a connecting shaft connected to said inner joint part and having a recessed surface portion; and
   a first stop;
   wherein during a collision, said torque transmitting balls translate off said inner race surface and drop into said recessed surface portion allowing said connecting shaft to collapse into said hollow shaft, said torque transmitting balls cross the edge of said inner forward portion prior to said outer rearward portion contacting said torque transmitting balls.

8. A propeller shaft assembly as described in claim 7 wherein said first stop comprises a grease cap.

9. A propeller shaft assembly as described in claim 7 further comprising:
   a second stop resisting said connecting shaft from collapsing into said hollow shaft.

10. A propeller shaft assembly as described in claim 9 wherein said second stop comprises a grease cap.

11. A propeller shaft assembly as described in claim 7 wherein said recessed surface portion includes an energy absorbing profile.

12. A propeller shaft assembly as described in claim 11 wherein said energy absorbing profile comprises a decreasing absorption profile.

13. A propeller shaft assembly as described in claim 11 wherein said energy absorbing profile comprises an increasing absorption profile.

14. A propeller shaft assembly for a vehicle comprising:

a constant velocity universal joint comprising:

an outer joint part including an outer race surface having an outer forward portion and an outer rearward portion;

an inner joint part including an inner race surface having an inner forward portion and an inner rearward portion;

a plurality of torque transmitting balls each guided in a corresponding pair of said outer and inner race surfaces; and a ball cage having a plurality of cage windows each accommodating one of said torque transmitting balls and holding said torque transmitting balls in a plane when said torque transmitting balls are in communication with said inner race surface and said outer race surface;

a hollow shaft connected to said outer joint part; and a connecting shaft connected to said inner joint part;

said outer rearward portion and said inner forward portion adapted to act as a first stop;

wherein during a collision, said torque transmitting balls cross the edge of said inner forward portion prior to said outer rearward portion contacting said torque transmitting balls, thereby allowing said connecting shaft to collapse into said hollow shaft without disintegrating said ball cage.

15. A propeller shaft assembly as described in claim 14 wherein said connecting shaft includes a recessed surface portion, said torque transmitting balls dropping into said recessed surface portion after crossing the edge of said inner forward portion.

16. A propeller shaft assembly as described in claim 15 wherein said recessed surface portion includes an energy absorbing profile.

17. A propeller shaft assembly as described in claim 16 wherein said energy absorbing profile comprises a decreasing absorption profile.

18. A propeller shaft assembly as described in claim 16 wherein said energy absorbing profile comprises an increasing absorption profile.

* * * * *